United States Patent
DeBoer et al.

(10) Patent No.: US 7,566,986 B2
(45) Date of Patent: Jul. 28, 2009

(54) SELECTION LINE AND SERIAL CONTROL OF REMOTE OPERATED DEVICES IN AN INTEGRATED POWER DISTRIBUTION SYSTEM

(75) Inventors: John DeBoer, Decatur, GA (US); William Anthony King, Jr., Loganville, GA (US); Seshagiri Rao Marellapudi, Norcross, GA (US); Paul Terricciano, Wake Forest, NC (US); David M. Williams, Alpharetta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 326 days.

(21) Appl. No.: 11/519,727

(22) Filed: Sep. 12, 2006

(65) Prior Publication Data

US 2007/0064360 A1 Mar. 22, 2007

Related U.S. Application Data

(60) Provisional application No. 60/716,220, filed on Sep. 12, 2005.

(51) Int. Cl.
*H02J 3/14* (2006.01)
(52) U.S. Cl. .......................... 307/31; 307/38
(58) Field of Classification Search ............ 307/31, 307/38
See application file for complete search history.

(56) References Cited

U.S. PATENT DOCUMENTS

| | | | |
|---|---|---|---|
| 5,301,083 A | 4/1994 | Grass et al. | |
| 5,386,363 A | 1/1995 | Haak et al. | 364/424.01 |
| 5,629,662 A * | 5/1997 | Floyd et al. | 337/36 |
| 5,964,891 A * | 10/1999 | Caswell et al. | 714/31 |
| 6,320,732 B1 | 11/2001 | Norman et al. | |
| 6,504,694 B1 | 1/2003 | Bilac et al. | |
| 6,671,148 B2 | 12/2003 | Evans et al. | |
| 2003/0205938 A1 | 11/2003 | Andarawis et al. | 307/11 |
| 2006/0175983 A1* | 8/2006 | Crouse et al. | 315/291 |

FOREIGN PATENT DOCUMENTS

| | | |
|---|---|---|
| DE | 4421267 | 1/1996 |
| DE | 10005066 | 8/2001 |
| GB | 2219448 A | 12/1989 |

OTHER PUBLICATIONS

PCT International Search Report, mailed Aug. 24, 2007.

* cited by examiner

*Primary Examiner*—Fritz M Fleming
*Assistant Examiner*—Dru M Parries
(74) *Attorney, Agent, or Firm*—Jose de la Rosa (57) ABSTRACT

A power distribution apparatus for distributing electrical power includes circuit breaker modules and remote operated devices mounted separately in a panel. The devices may be relays, circuit breakers, meters, dimmers or other devices for controlling a circuit. An I/O controller board is connected to the remote operated devices and controls those devices through a data rail. A control module may interface with the I/O controller board and may also interface with other I/O controller boards and with one or more networks. A serial communications line connects the I/O interface board with a number of remote operated devices. A separate select line runs from each remote operated device to the I/O controller board. To operate a particular device, the I/O controller board asserts the select line of that device, causing the device to listen for messages on the serial line. The relay executes commands contained in a message only of the select line for that device is asserted.

29 Claims, 8 Drawing Sheets

SELECTION LINE AND SERIAL CONTROL OF REMOTE OPERATED DEVICES IN AN INTEGRATED POWER DISTRIBUTION SYSTEM

CROSS REFERENCE TO RELATED APPLICATIONS

This application claims the benefit of U.S. Provisional Application Ser. No. 60/716,220 entitled "Integrated Lighting Control," filed on Sep. 12, 2005, the contents of which are hereby incorporated by reference herein in their entirety.

FIELD OF THE INVENTION

The present invention relates generally to residential and commercial electrical power distribution panels and components, and more particularly, to an apparatus and method for selectively providing power to circuits served by such panels and components.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

A disadvantage of such a system is that the panel control unit contains complex electronics for each of the circuit breaker positions on the panel. There are typically 42 such positions. The electronics for all 42 positions is built into the switchgear whether or not circuit breakers are actually installed in all positions. For example, a customer may purchase a panel having only 6 of the 42 circuit breaker positions occupied. That customer would be required to purchase the electronics for all 42 positions, because the electronics is already contained in the single control unit.

It would be advantageous is to place the breaker control electronics in the breakers themselves, and simply send messages over a bus addressed to individual breakers. Such a decentralized control solution, however, requires a reliable addressing technique, wherein individual breakers located in specific positions on the panel may be identified and commanded. The addressing system must be robust enough to withstand the electrically noisy environment of the electrical power distribution panel.

That decentralized scenario would require that each individual breaker be identified to the control unit as being in a certain position in the panel. In one possible solution, a control unit interface prompts the customer to identify breakers with panel positions, for example, by pushing a button on a breaker when a position is prompted. That technique would place a significant burden on the customer when the breakers are installed or replaced, and relies on internal memory in the breaker to maintain reliability.

In another possible scenario, the breaker itself may read a resistance or another electronic indicator associated with a specific position in the panel. For example, a resistor may be placed on the control bus at each breaker position. The breaker would read the resistance and identify itself to the controller as being in a particular position corresponding to that resistance. That technique would require the expense of indicators at every panel position, and electronics in the breaker to perform the initialization routine.

Special panel boards and enclosures are typically utilized for systems permitting remote operation of circuit breakers. Specifically, panels are extended in length in order to accommodate a control unit. For example, a special panel may be constructed having an end that is extended to fit the panel control unit. Such a design precludes retrofitting standard panels and enclosures for use with remote-operated circuit breakers.

There is therefore presently a need to provide an improved method and system for selectively distributing power from a power distribution panel. The method and system must be robust enough to withstand the high ambient noise levels inherent in power distribution systems, and must be highly reliable. Unnecessary cost should be minimized, especially when breaker positions are left open in the panel. The physical panel layout should be such that existing non-remote actuated panel designs can be retrofitted with the necessary components.

SUMMARY OF THE INVENTION

One embodiment of the present invention is a system for selectively distributing electrical power from an electrical power source to a plurality of load circuits. The system includes a plurality of remote operated devices, each device being electrically connected to the electrical power source and to one of the plurality of load circuits for selectively delivering the electrical power to the one load circuit; a serial communications line interconnecting the plurality of remote operated devices; and a plurality of select lines, each remote operated device being connected to a single select line, each select line being connected to at most one remote operated device; wherein each remote operated device is configured to execute commands received on the serial communications line only upon assertion of the select line connected to that remote operated relay.

The system may further include an I/O controller board electrically connected to the serial communication line and to the plurality of select lines for controlling the remote operated devices. A data rail may interconnect the plurality of remote operated devices and the I/O controller board. The data rail includes the select lines and the serial communication line. The data rail may also include a control power line for providing control power to the plurality of remote operated devices.

The system may further comprise a system controller connected to the I/O controller board for controlling the I/O controller board. The system controller may include an interface for controlling at least one additional I/O controller board.

The system may include a panelboard having a plurality of load circuit positions, wherein each select line is associated with a unique load circuit position and each remote operated device is in a unique load circuit position.

The system may further include electrical power lugs for connecting the electrical power source, in which case the I/O controller board is near an edge of the panel board opposite the lugs.

A plurality of circuit breaker modules may be included in the system, each circuit breaker module being in a load circuit position in the panelboard and electrically connected to the electrical power source in series with a remote operated device in the position. In that case, the remote operated device may be removable from the panel separately from the circuit breaker module.

The remote operated device may be a relay, a circuit breaker, a meter or a dimming device.

Another embodiment of the invention is a remote operated device for selectively distributing electrical power from an electrical power source to a load circuit. The remote operated device comprises a first terminal for receiving power from the electrical power source, a second terminal for connecting to the load circuit, a circuit device for altering a conductive path between the first and second terminals, a serial communications interface for receiving a command on a serial communications line, a select line terminal for connecting a select line, and a processor connected to the serial communications line, the select line terminal and the circuit device, the processor being configured to operate the circuit device in response to the command only if the select line connected to the select line terminal is asserted.

The remote operated device may further include at least one sensor for determining a state of the circuit device, the sensor being connected to the processor, and wherein the processor is further configured to process a signal from the at least one sensor in response to a command only if the select line connected to the select line terminal is asserted.

The remote operated device may also include a mechanical override switch for manually switching the conductive path between the first and second terminals. The device may also include a magnetic latch for operating the circuit device.

A dimming device may be included in the remote operated device, the dimming device connected for adjusting power to the load circuit, the dimming device being connected for communication with the processor.

Another embodiment of the invention is a method for selectively connecting power to a load circuit. The method includes the steps of receiving over a serial communications line a command to close a relay between a power source and a load circuit; receiving over a select line separate from the serial communications line, a select signal; and, only if the select signal is in a select state, executing the command to close the relay.

The method may further comprise the steps of receiving over the serial communications line a command to open the relay; and, only if the select signal is in a select state, executing the command to open the relay.

The method may further comprise the steps of receiving over the serial communications line a command to perform diagnostics on the relay; and, only if the select signal is in a select state, executing the command to perform diagnostics on the relay.

The step of executing the command to close the relay may also include applying a 1.7 amp, 24 volt, 2 to 2.5 ms pulse to the relay. The step of executing the command to close the relay may further comprise verifying that the relay is closed via a sensor for reading contact position.

The method may also include the step of, only if the select signal is not in a select state, ignoring the command to close the relay.

The step of executing the command to close the relay may be executed only if the select signal is in a select state at the time the command is received on the serial communications line.

DESCRIPTION OF THE INVENTION

The integrated lighting system of the present invention permits a user to control (e.g., switch on and off, dim, meter) power circuits such as those typically used for lighting, resistive heating, air conditioning or other any other electrical device in the home, office or industrial environment. The control is implemented via a system of lighting panels or panelboards. In a preferred embodiment, each panel manages up to 42 circuits.

Figure 1:
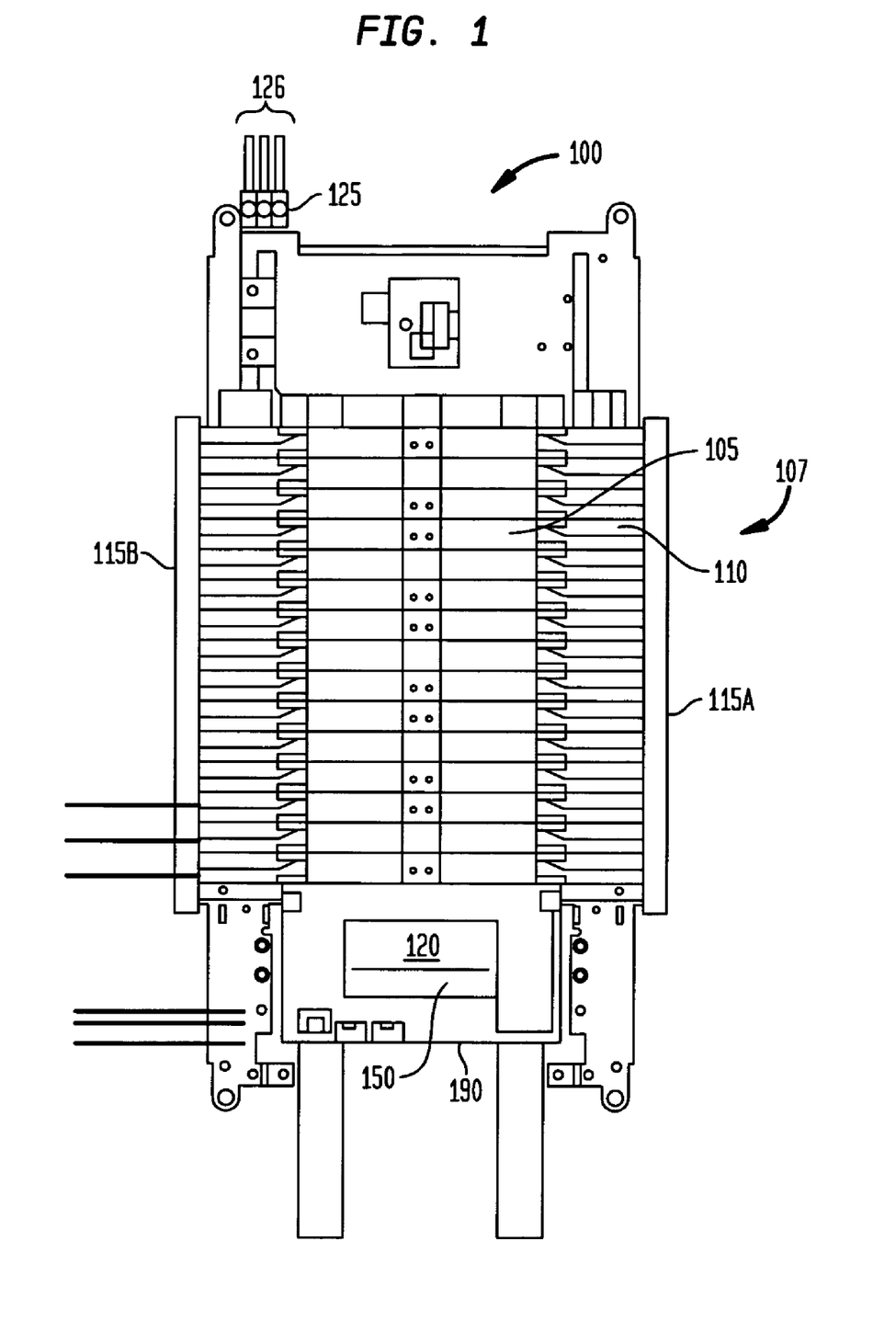
FIG. 1 is a schematic plan view of a power distribution panel according to one embodiment of the invention.

An exemplary panel 100 according to one embodiment of the invention is shown in FIG. 1. Line power enters the panel through power source cables 126 connected to lugs 125. Line power may, for example, be a 3-phase 480Y277, 240 or 120 VAC power source. Each load circuit in the panel corresponds to a load circuit position such as position 107, fed by the power source. In each fed position 107 is a circuit breaker such as breaker 105. In a preferred embodiment, a Siemens BQD circuit breaker is used.

In accordance with the invention, each circuit that is to be controlled also has a remote operated device 110, such as a relay, a meter or a dimmer. The term "remote operated device" as used herein includes any other device that controls, monitors or may otherwise be used in a load circuit. While, in a preferred embodiment, the remote operated device is a separate component from the circuit breaker, the term "remote operated device" as used herein encompasses devices integral with the circuit breaker. The remote operated devices 110 are connected to data rails 115A, 115B installed along both sides of the panel. An I/O controller board 120 controls the remote operated devices 110 through the rails 115A, 115B.

Figure 2:
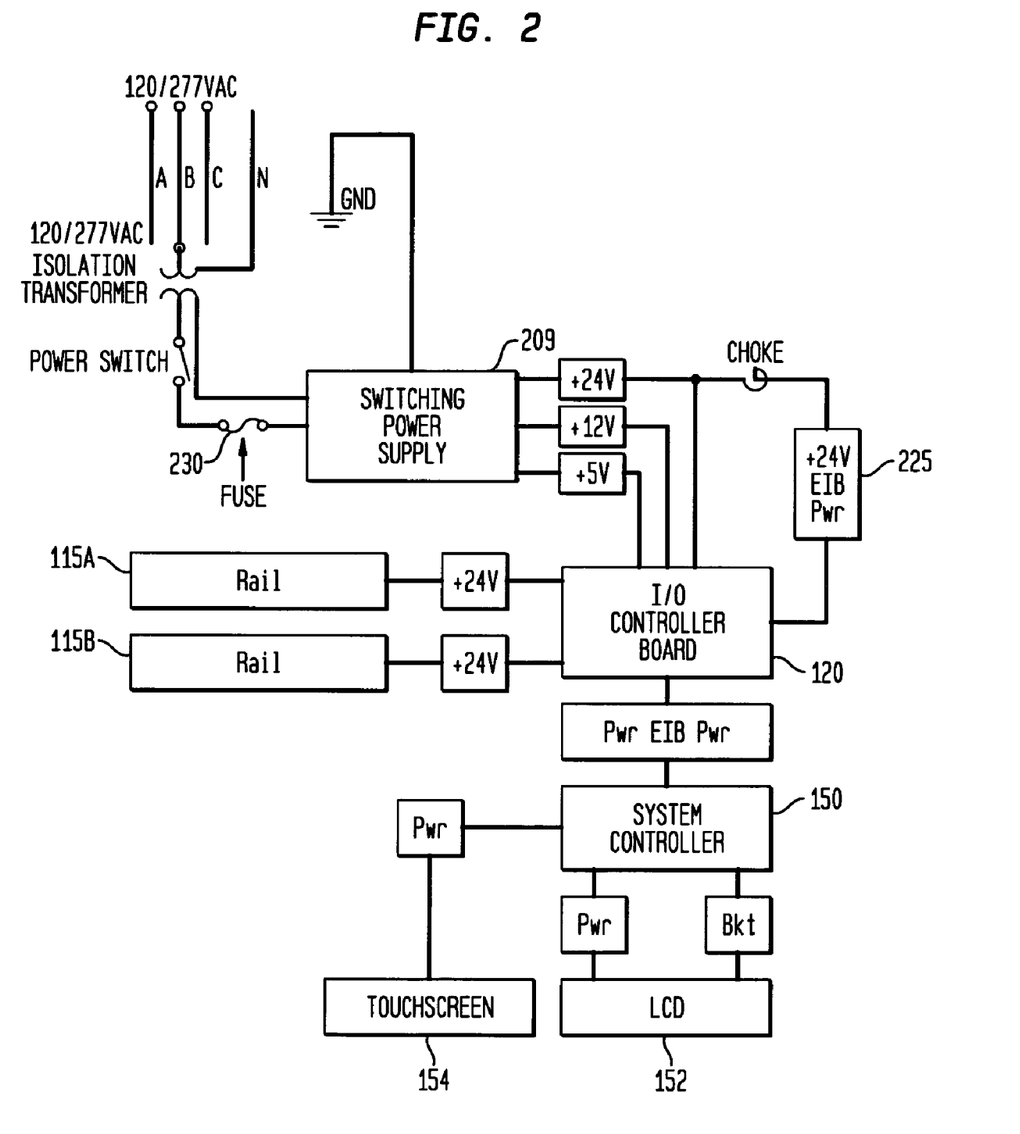
FIG. 2 is a schematic diagram of the switching power supply of a power distribution panel according to one embodiment of the invention.

A switching power supply module 209, shown in FIG. 2, supplies switching power to the I/O controller board 120 and through the board 120 to the rails 115A, 115B. Power to a system controller 150 including an LCD display 152 and/or touch screen 154, described in more detail below, is also provided through the I/O controller board 120.

Figure 3:
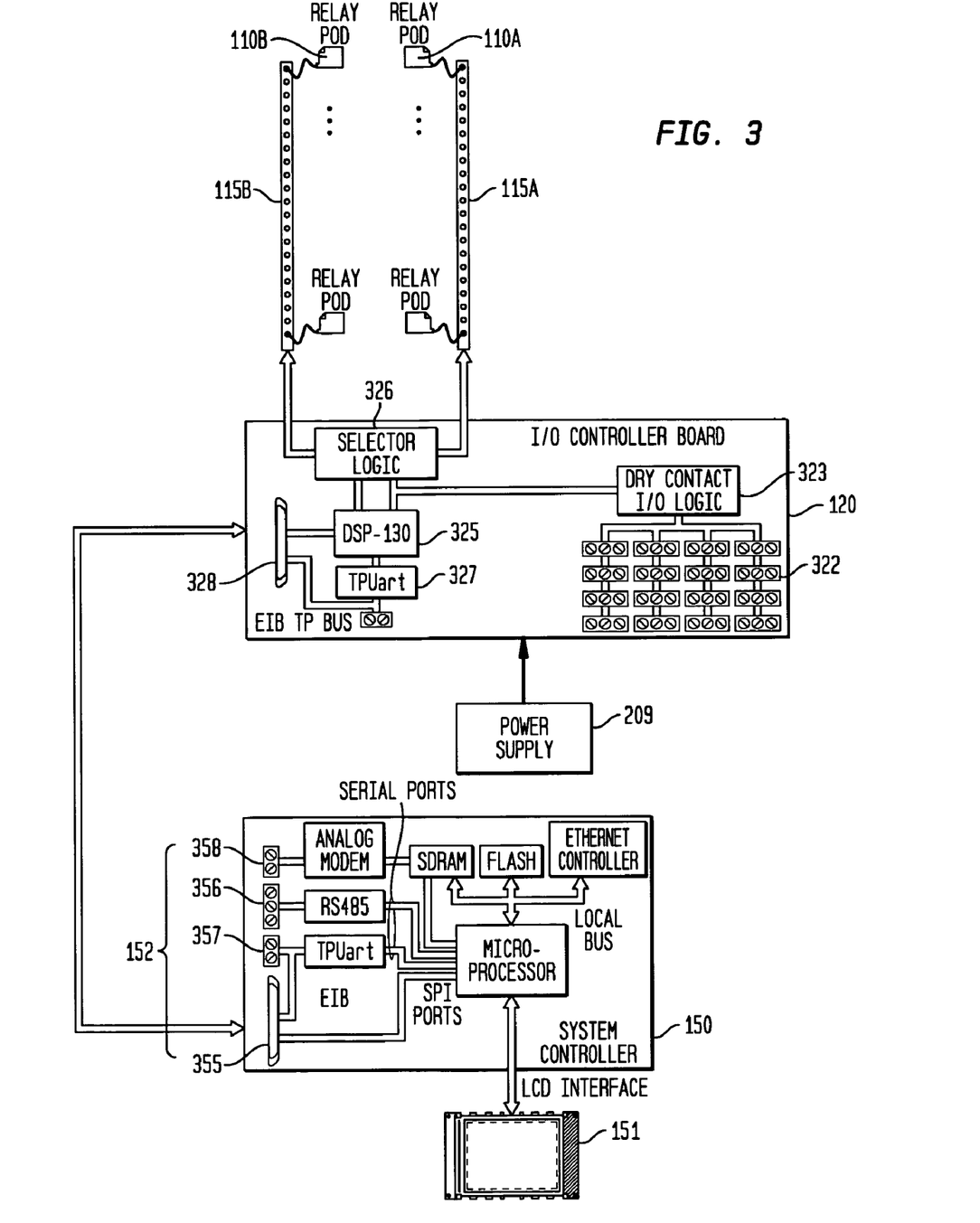
FIG. 3 is a schematic diagram of a stand-alone power distribution panel according to one embodiment of the invention.

In one embodiment of the invention, shown in FIG. 3, the I/O controller board 120 functions as a stand-alone distributed I/O block in a power distribution system. In that case, each panel functions as a standalone panel. The I/O controller board 120 supplies power and control signals through the rails 115A, 115B to the remote operated devices 110A, 110B. A user interface and high-level scheduling and control are provided by a control module 150. The control module 150 may provide dry contact I/O (not shown), a LCD touch screen user interface 151, and several addition communication ports 152. The control module provides an application that gives the user a means of configuring control schedules, organizing remote operated devices into groups, assigning schedules to groups, configuring the discrete I/O functionality, and configuring the distributed I/O functions.

Figure 4:
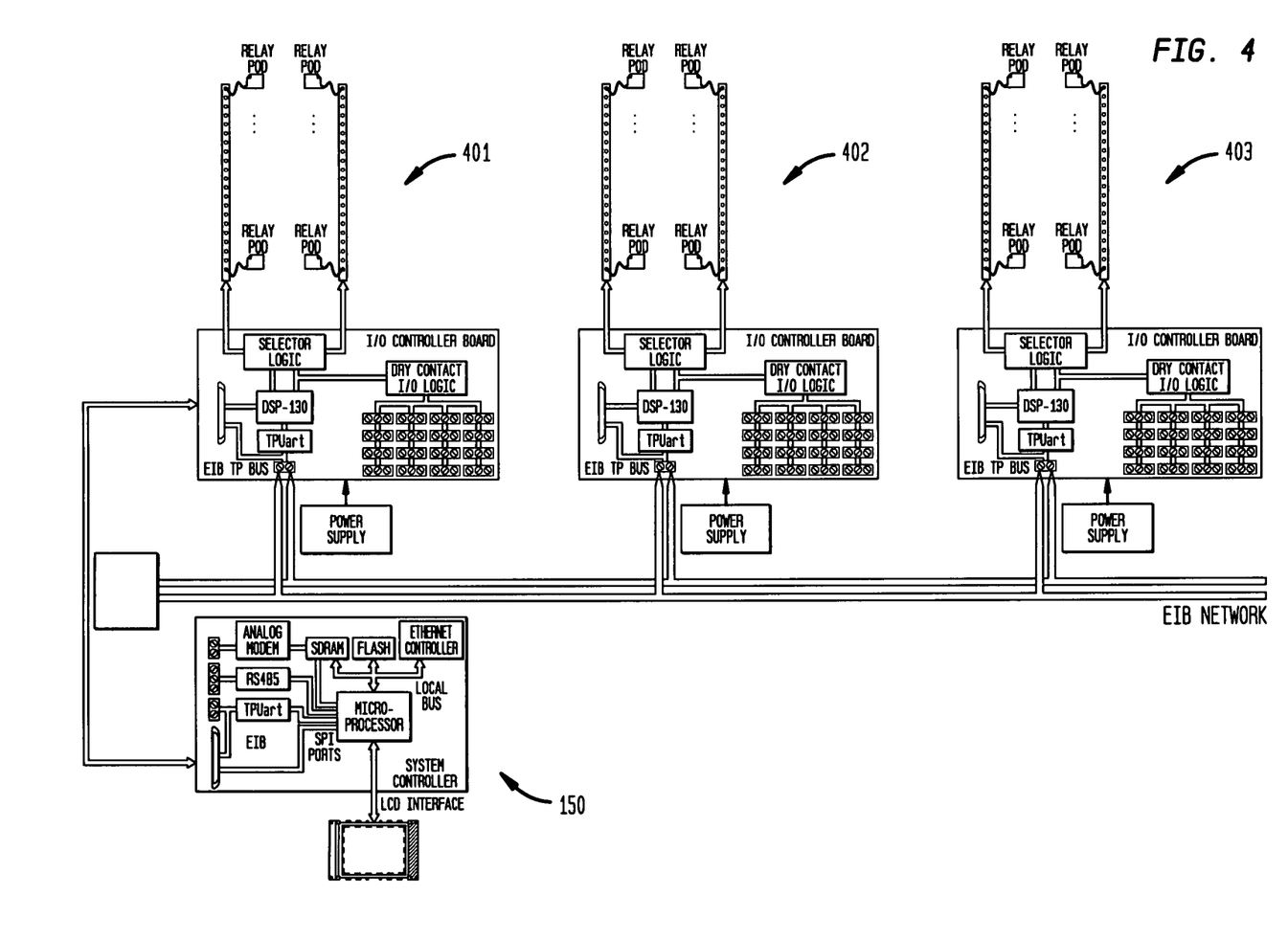
FIG. 4 is a schematic diagram of a network of power distribution panels according to one embodiment of the invention.

In another embodiment shown in FIG. 4, multiple panels 401, 402, 403 are configured to work as a single unit with one panel 401 being configured as a master, and the other panels configured as slaves. To configure the panel 401 as a master, the system controller 150 is added. The slave panels 402, 403 contain no system controller.

Figure 5:
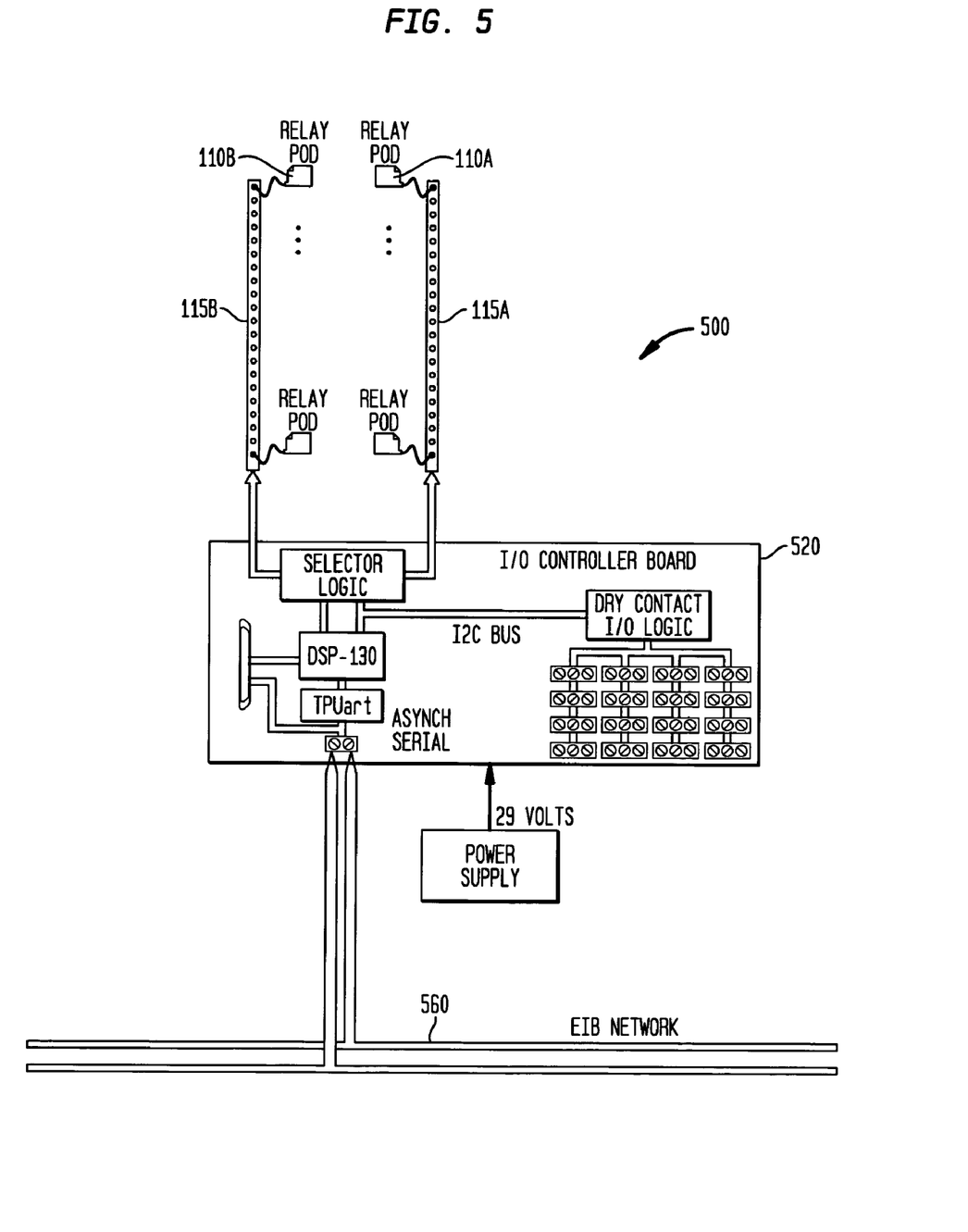
FIG. 5 is a schematic diagram of a slave power distribution panel according to one embodiment of the invention.

An exemplary slave panel 500 is shown schematically in FIG. 5. The I/O controller board 520 powers and controls the remote operated devices 110A, 110B through rails 115A, 115B, respectively. The I/O controller board is connected to other slave panels and a master panel through an EIB (European Installation Bus) network 560 or other similar network.

The integrated power distribution system of the present invention may utilize components from existing systems, thereby decreasing tooling and inventory costs, training requirements, etc. For example, returning to FIG. 1, the system of the invention may utilize an existing panel board 100 and an existing circuit breaker 105 used with that panel board in presently-used power distribution systems. In that case, new components include the remote operated device 110 that connects to the load side of the breaker 105. Wiring to the loads is connected to the remote operated device. The remote operated device contains electronics necessary to connect to and communicate with the I/O controller board 120 in the panel. The data rails 115A, 115B are added to the existing panel design down the length of the breakers 105, providing a means for connecting the remote operated devices 110 to the controller 120.

At either the bottom or the top of panel 100, as dictated by whether the panel is top-fed or bottom-fed, is the device interface module 120. In a preferred embodiment, the device interface module 120 is near an edge of the panel opposite the power feed lugs 125. The device interface module contains the minimum functionality to allow it stand alone, or to serve as a slave panel to another panel on an EIB network. The control module 150 may can be added as described above.

Individual components of the inventive system will now be described in turn. Referring to schematic illustrations of FIGS. 6 & 7, the remote operated device 110 may be an electromechanical relay or another device that connects to the load side of the breaker 105 through a first terminal 613. A wire connection to a lug or second terminal 611 is then made from the load to the load side of the remote operated device 110. In the particular example of FIG. 7, the remote operated device is a remote operated relay.

The remote operated device 110 includes a circuit board 750 with a microprocessor 790 and a four- or five-wire connector 616 for connection to the data rail 115. The connector to the data rail includes terminals for a common connection 661, a 24 volt power connection 662 for operating the electronics and the solenoid, a select line 663 used by the device interface module to select a particular remote operated device, and a serial communication interface line 664. In the relay example of FIG. 7, the processor 750 in the remote operated device 110 manages timing of the application of power to a solenoid 751 to minimize power required from the 24 volt connection 662 and also to insure the proper operation of the solenoid. The processor contains instructions stored on non-volatile media for performing various tasks including opening and closing the relay switch 760 via the solenoid 751, and verifying a position of the relay switch 760 using a sensor 752.

A unique select line is assigned to each breaker/remote operated device position within the panel. For example, in the schematic illustration of FIG. 6, select line 663 is connected to the remote operated device 110 in position 1; select lines 673, 683, 693 are connected to remote operated devices 670, 680, 690 in positions 2, 3 and 4, respectively. Select lines may therefore be individually asserted by the I/O controller board 120 (FIG. 3) to select single remote operated devices.

Figure 6:
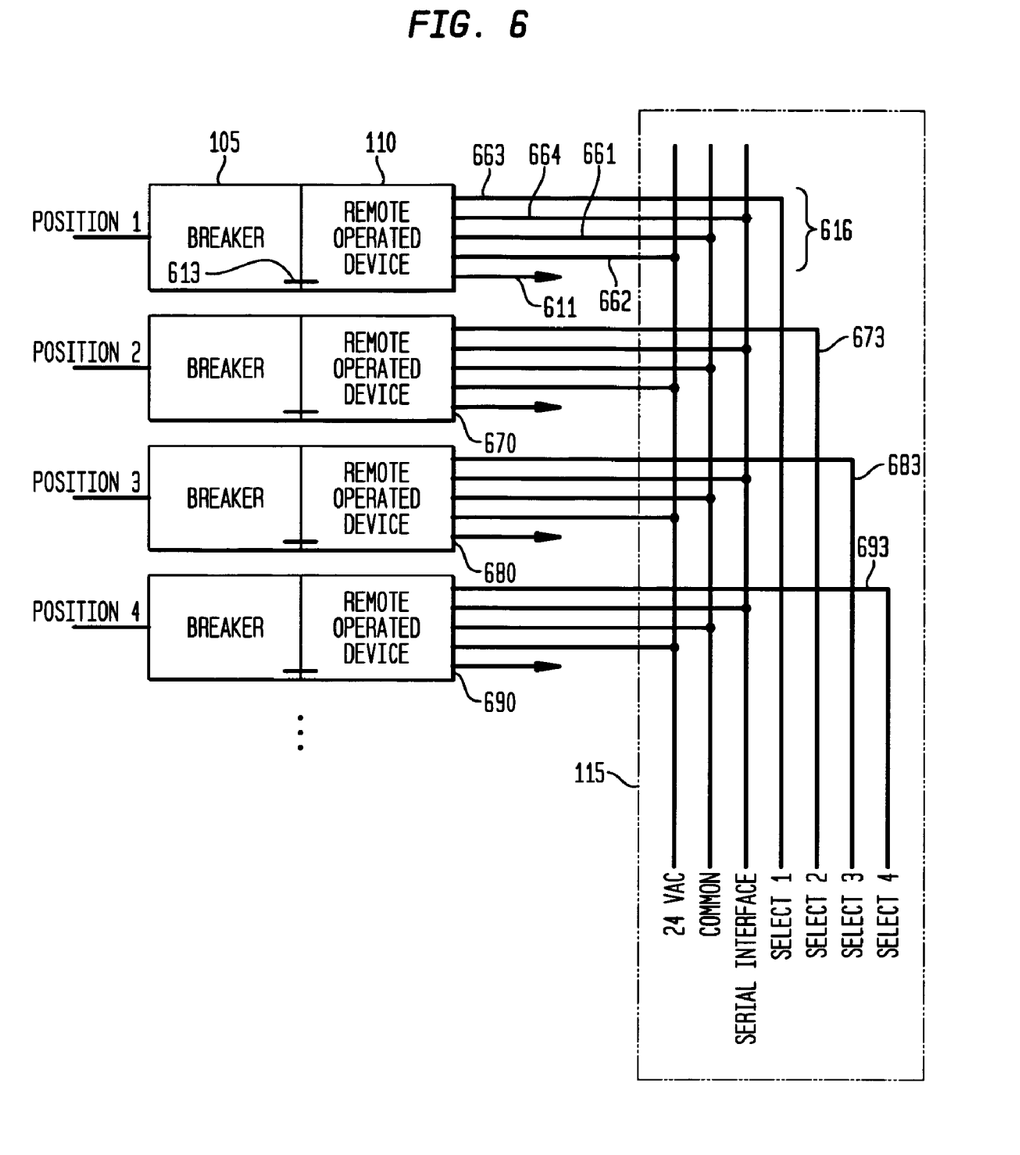
FIG. 6 is a schematic wiring diagram of a plurality of remote operated devices and breakers according to one embodiment of the invention.

When the select line 663 is asserted, the remote operated device 110 listens for messages on the serial interface 664. Conversely, messages on the serial interface 664 are ignored if the select line is not asserted. A response by the remote operated device to a serial command is therefore conditional on whether the select line is asserted. The term "asserted," as used herein, means one state of a signal designated to cause the remote operated device to listen for messages. In a preferred embodiment, the select line has "high" and "low" states, the "high" state being the "asserted" state.

Addressing using the select lines is specific to a particular position in the panel because the select lines are physically routed to particular positions. It is not necessary for the remote operated devices to be aware of their positions in the panel to identify which incoming messages on the serial line are addressed to them. Instead, the remote operated device identifies a relevant message on the serial line by monitoring whether the select line is asserted. No initialization of the remote operated devices to assign panel positions is necessary. The location of the remote operated device 110 within the panelboard is therefore uniquely identified by I/O controller board 120 without the need for initialization or set up (i.e., each remote operated device can be controlled without the need for a switch and LED to predetermine the address, thus no user intervention is required prior to first use).

The addressing system of the invention is a robust system that is resistant to the electrical noise encountered in the power distribution environment of the panel. Because the remote operated device listens for messages on the serial line only when the select line is asserted, the probability of noise being interpreted as a message is greatly reduced. Further, because the select signal is a simple on/off or high/low signal, the probability is small of a remote operated device incorrectly executing a command intended for another remote operated device.

The command messages may be either broadcast commands or point-to-point communications. The message may, for example, be a command to open or close a relay in the remote operated device, a request for status, a request for an error report, a reprogramming command, a command for dimming functions for adjusting or measuring power to the load circuit (if the remote operated device contains such functionality), a request for a full diagnostic, or other operational commands.

The remote operated device 110 is attached to the load side of a circuit breaker 105 within a panelboard 100 using a conductor tab 613 (FIG. 6) inserted into the breaker lug (not shown). The remote operated device 110 has a lug of the same size as that of the breaker on the opposite side from the tab for installing a load wire.

In one exemplary embodiment, the remote operated device 110 may be a relay having a mechanical override switch (not shown) used to close the relay contacts manually. In addition, each remote operated relay may have an indicator (not shown) to show the position of the relay contacts. The override switch and indicator are functional without power applied to the remote operated relay.

Figure 7:
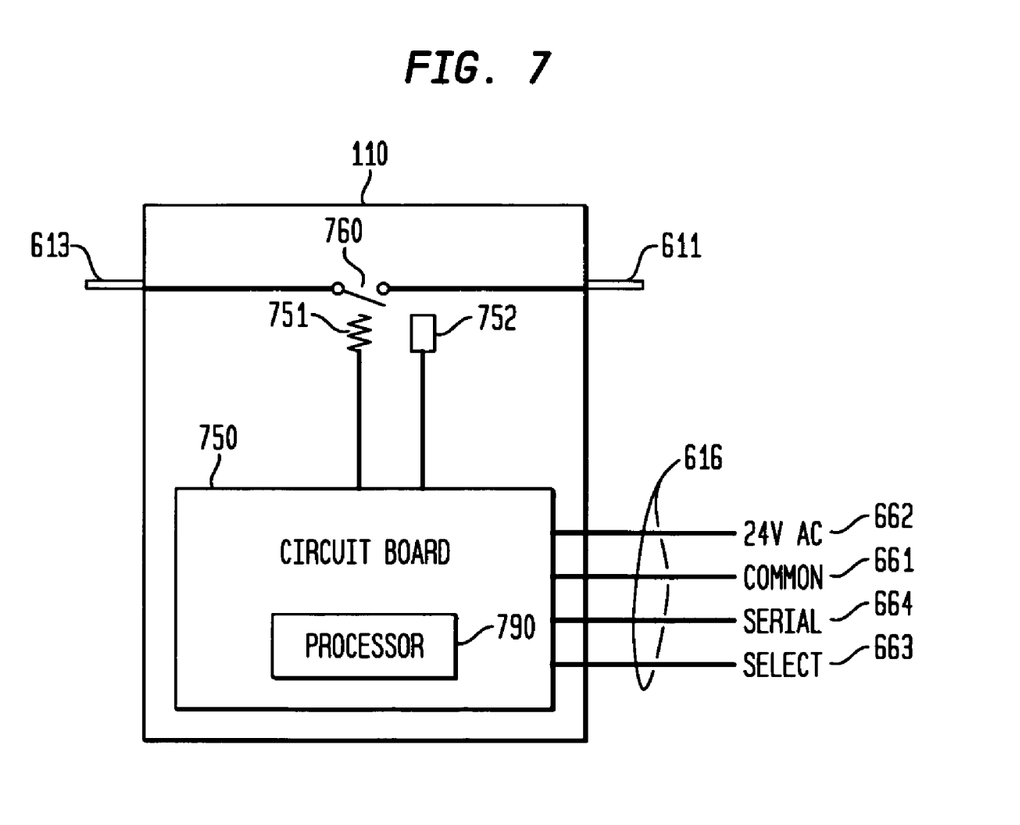
FIG. 7 is a schematic diagram of a remote operated relay according to one embodiment of the invention.

Electronics on the circuit board 750 (FIG. 7) within the remote operated device are used to control device functionality. For example, the board may control the opening and closing of the relay contacts under normal operating conditions by actuating a magnetically held solenoid (magnetic latch) 751 (FIG. 7). Power for the electronics is drawn from a 24V bus connected from the rail 115 to each device.

In a preferred embodiment, the printed circuit board (PCB) electronics 750 are at the bottom of the remote operated device, beneath the main conductor contact 611 and lug 613. Wires from the magnetic latch 751 are insulated and routed to a connector on the PCB 750. Wires from a relay position sensing mechanism 752 are also insulated and routed to a second connector on the PCB.

In the example where the remote operated device is a relay, the electronics circuit board 750 contained in a remote operated device may include two output circuits capable of pulsing the magnetic latch 751 at approximately 1.7 A and 24V. The "CLOSE" pulse is 2 to 2.5 ms in duration, and the "OPEN" pulse is 10 to 20 ms in duration. The "OPEN" pulse is opposite in polarity to "CLOSE" pulse. The PCB electronics 750 also include an input circuit for sensing the position of the contacts, and a "dry contact" input for EIB applications.

The processor 790 comprises an oscillator/microcontroller for output control and timing, input sensing, magnetic latch current sensing (if the device includes a magnetic latch) and serial communications to the I/O controller board. In addition, the circuit board 750 also preferably contains a voltage regulator/power supply circuit, an analog input circuit for magnetic latch current sensing and protection, a communications drive circuit for the serial bus and a buffer circuit for enable line.

The data rails 115A, 115B (FIG. 1) are shielded communication buses that allow communication among a plurality of remote operated devices 110 on one side of a panel 100, and the I/O controller board 120. In a preferred embodiment of the invention wherein a panel 100 contains positions for 42 breakers and 42 remote operated devices, each data rail 115 connects the 21 remote operated devices on a single side of the panel. Each panel includes two data rails.

The data rail provides a barrier to isolate the Class 1 load wires from the Class 2 signal wires used to manage the remote operated devices. The data rail 115 connects to each remote operated device 110 via a connector (not shown) that extends out of the remote operated device. The connector has four or five leads. Structurally, the data rail 115 may be used to support the remote operated devices and is mechanically attached directly to the interior of the panel 100.

The end connection of the data rail 115 to the I/O controller board 120 is a 25-29 conductor ribbon connector, depending on design details. This ribbon connector is protected from Class 1 elements and does not cover the neutral extension.

The data rails 115 may be made available in a plurality of sizes to allow customers to install various numbers of remote operated devices on a single panelboard. For example, rails may be made with 9, 15 and 21 available connections to remote operated devices. The rails may be made with two end connections for I/O controller boards 120, to allow for symmetrical data rails for the left and right hand side.

The data rail 115 may have provisions that encapsulate the Class 2 wiring connecting the devices together as well as any wire connections running from the remote operated devices to the data rail. The data rail, if appropriate, may be capable of moving into two different positions such that in a first position the remote operated devices are mechanically supported and the wire is sufficiently guarded, and in a second position, the devices are free to rotate.

The data rail 115 preferably comprises a PCB that contains traces including a plurality of line selector traces to route from the ribbon connection to each select line connector (one for each remote operated device position), a serial communication trace to all remote operated devices, 1-4 power traces for carrying 24 VDC from the ribbon connection to all devices, and 1-3 ground traces from the ribbon connection to all devices. In a preferred embodiment of the invention, reverse installation of the remote operated devices in the data rails is not possible.

The I/O controller board 120 (FIG. 3) implements several functions in the system. The board provides the discrete I/O to the panel via dry contact switches such as standard wall switches (not shown), connected to the I/O controller board via dry contact terminals 322 and dry contact logic 323. Each dry contact terminal 322 is organized as two inputs and a common. That facilitates inputs from momentary rocker switches.

As described above, the I/O controller board 120 also generates the selector line signals and serial communications to the remote operated devices 110 through the data rails 115. The processor 325 on the I/O controller board controls and generates all the communications to the devices, using selector logic 326.

The I/O controller board also implements an EIB interface. To an EIB network, that interface makes the panel appear as a single EIB device with 42 outputs and 32 inputs. The EIB interface may, for example, be implemented using a Siemens TPUart interface 327.

A low profile connector 328 located on the I/O controller board 120 allows directly mating a system controller 150. The I/O controller board 120 can operate as a stand-alone controller or connected to a system controller 150. Without a system controller, the I/O controller board 120 responds only to communications over the EIB interface and performs no actions on its own.

The EIB line is routed to the connector 328. The system controller 150 operates the remote operated devices 110 via the I/O controller board 120 using EIB messages. A separate SPI interface may also be supported on the connector 328. That interface may be used in lieu of the EIB for communication from the system controller 150 to the I/O controller board 120 in cases where bandwidth on the EIB network is insufficient.

The system controller 150 provides the user with an application to implement lighting schedules, organize devices into logical groups, manage the inputs, and get status. A local user interface is implemented by the system controller 150 as a 320×240 monochrome LCD display 151 with touch screen support.

The system controller 150 has several communications interfaces. The controller connects with one or more I/O controller boards 120 through an EIB interface 355. In addition, an RS485 serial interface 356 may support proprietary protocols such as Modbus RTU protocol, an interface to Siemens building automation systems. A 10/100 Ethernet interface 357 may support an HTTP server and Modbus TCP/IP. The HTTP server may allow the user to connect a thin net browser to the controller to perform all of the functions provided by the local user interface as well as some more complex configuration and programming features. A USB interface (not shown) may also be provided. Additionally, an analog modem 358 provides a means for connecting the system controller 150 and its panel to an analog telephone line for rudimentary control functions via a touch tone phone. Communications interfaces with other systems and protocols, existing or to be developed in the future, are also contemplated and are within the scope of the present invention.

The system controller 150 preferably contains sufficient storage for complicated lighting schemes, including schedules, zones, schema selections, logging, etc. That storage may require a small database, since a given controller may control up to 42 light switches locally and may control other lighting control panels remotely. In one embodiment, the system controller controls up to 64 panels. The total storage requirement may reach a maximum size of 20 GB, and is preferably at least 256 MB. That storage does not include storage required for the operating system.

Referring to FIG. 2, the power supply 209 provides an isolated power source to the all the control components including the remote operated devices, the I/O controller board 120, the system controller 150 and the EIB network. The I/O controller board 120 and the system controller 150 each have DC-DC converters deriving regulated DC voltage levels as required from the main DC output 225 of this power supply. In the case of remote operated relays, that main supply also provides 24 volts to the relays which the electronics modulates to operate the internal solenoids, via the rails 115A, 115B. Solenoids 751 in the remote operated devices (FIG. 7) require up to two amperes to operate and there may be up to 42 remote operated devices in a panel. The system manages operation of the devices so that the main dc power supply 209 will not have to source more than 3.5 amperes.

The power supply also has a second current limited supply (not shown) at 29 volts. That supply is used to source power for the EIB network. The output impedance of that supply is critical and must meet Konnex (EIB Specification Organization) specifications. That supply is preferably a current limiting supply that limits the output current to 325 milliAmperes in a dead short. The input to that supply should be universal such that the input power may be 50 or 60 Hertz and range from 90 to 290 volts RMS.

The fuse element 230 protects the power supply 209, system controller 150, and I/O controller board 120 from short circuits that occur on the bus. The fuse element 230 is positioned between the power supply and the bus itself. The customer has access to the fuse 230 in the event that an overcurrent is delivered to the entire panel.

In one embodiment of the present invention, proximity of the breakers 105 (FIG. 1) and remote operated devices 110 requires the use of a neutral extension (not shown) mounted to the subfeed neutrals of the panelboard. The neutral extension allows a user to gain additional low amperage neutral connections with the remote operated devices partially covering the normal neutrals.

The presently-described lighting control system may be implemented without changes to a standard panelboard. All connections for Class 2 wiring requires only drilling of the can to allow the Class 2 wire to be routed out of the panel.

As used herein, the term "controller box" refers to the box 190 (FIG. 1) containing electronics hardware associated with the I/O controller board 120, the system controller 150, and the touch screen 154. The controller box has necessary provisions to connect with the power supply and the data rails (which may require multiple connections).

Access points exist in the controller box 190 such that the customer can gain access to several connections. Those access points are covered with a removable lid such that the customer can gain access to the connections, but allow the connections to be guarded from incidental contact.

The entire controller box 190 fits within a slot of the panel 100 opposite the power lugs 125 for connecting power cables 126. For example, in one embodiment of the invention, the controller box fits within the TVSS slot of a standard P1 panelboard manufactured by Siemens Energy & Automation. By placing the controller box opposite the power entry point in the panel, a standard panelboard with little or no modification (other than drilling the panelboard for class 2 wiring) may be used.

Figure 8:
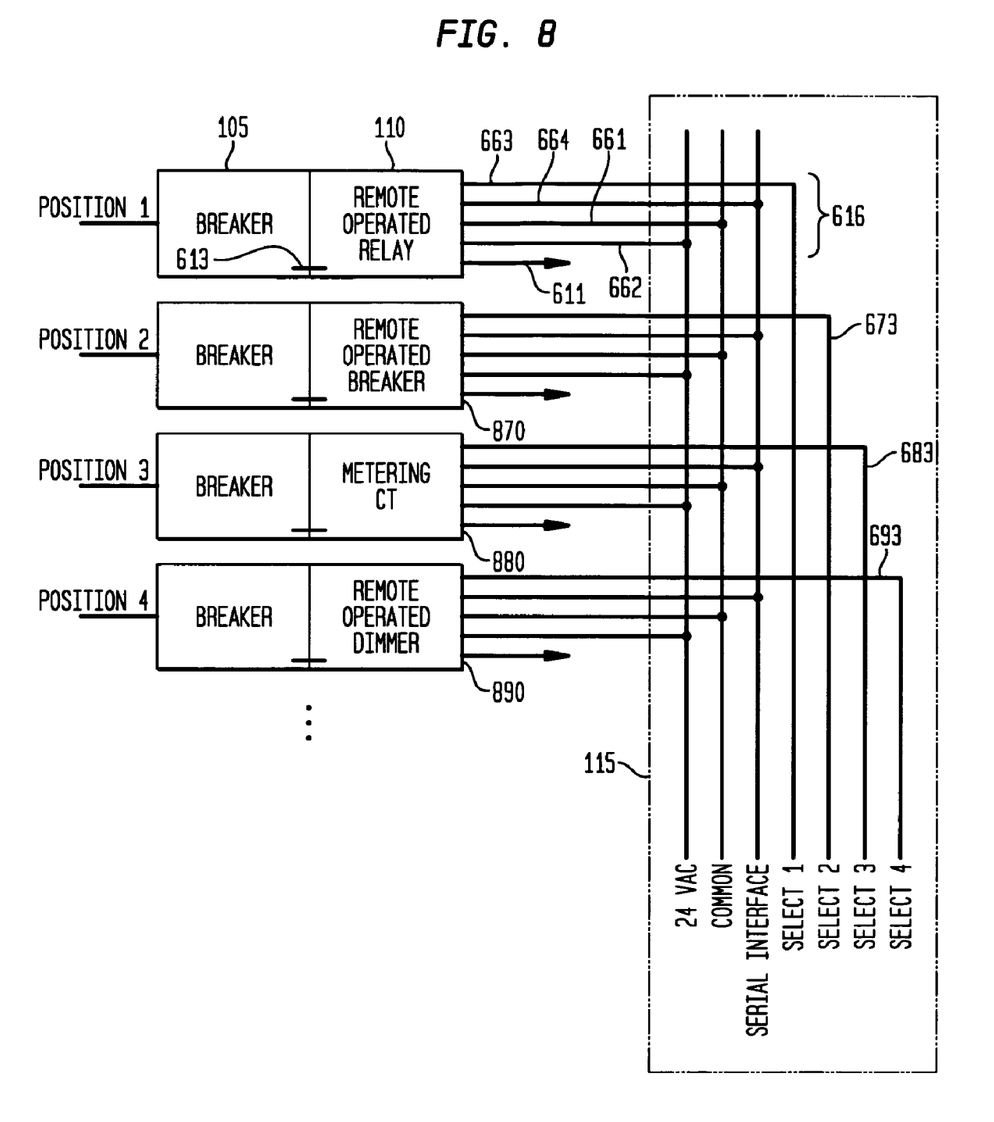
FIG. 8 is a schematic wiring diagram of a plurality of remote operated devices and breakers according to one embodiment of the invention.

A system similar to the system shown in the schematic illustration of FIG. 6 is illustrated in FIG. 8, wherein like elements are indicated by like element numbers. A remote operated relay 110 remains in position 1 of the panelboard. In position 2, however, a remote operated breaker 870 is installed. Likewise, a metering circuit 880 is installed in position 3 and a dimming device 890 is installed in position 4. The metering circuit may be remotely accessed to load stored consumption information as well as to access instantaneous current flow information to the load circuit associated with position 3. The dimming device may be controlled to regulate power delivered to the load circuit associated with position 4.

The devices 870, 880, 890 are merely exemplary, and other types of devices are contemplated as part of the invention. The present architecture permits additional devices to be easily added. Because a device "listens" to a command only when its select line is asserted, additional serial commands for added device types may be added to the protocol without changing existing devices. Any type of device may be placed in any position on the panelboard without altering the panelboard and without reprogramming the device.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while the apparatus is disclosed herein with respect to particular panelboard layouts and geometries, the techniques and configurations of the invention relating to select line addressing of the remote operated devices may be applied to any power distribution arrangement. It is to be understood that the embodiments shown and described herein are only illustrative of the principles of the present invention and that various modifications may be implemented by those skilled in the art without departing from the scope and spirit of the invention.

What is claimed is:

1. A system for selectively controlling and distributing electrical power from an electrical power source to a plurality of load circuits, comprising:
    a plurality of remote operated devices, each device being electrically connected to the electrical power source and to one of the plurality of load circuits for selectively operating the respective remote operated devices and controlling the electrical power distributed to the one load circuit upon receipt of an execute command;
    an I/O controller board for controlling the remote operated devices;
    a serial communications line interconnecting the plurality of remote operated devices and the I/O controller board; and
    a plurality of select lines in communication with the I/O controller board, each of the select lines being communicatively coupled to a corresponding one remote operated device in parallel to the serial communications line;
    wherein each remote operated device is configured to execute commands received on the serial communications line only upon assertion by the I/O controller board of the select line connected to the corresponding remote operated device.

2. The system of claim 1, further comprising a data rail interconnecting the plurality of remote operated devices and the I/O controller board, the data rail including the select lines and the serial communication line.

3. The system of claim 2, wherein the data rail further comprises a control power line for providing control power to the plurality of remote operated devices.

4. The system of claim 1, further comprising a system controller connected to the I/O controller board for controlling the I/O controller board.

5. The system of claim 4, wherein the system controller further comprises an interface for controlling at least one additional I/O controller board.

6. The system of claim 1, further comprising:
    a panelboard having a plurality of load circuit positions;
    wherein each select line is associated with a unique load circuit position and each remote operated device is in a unique load circuit position.

7. The system of claim 6, further comprising:
    an I/O controller board electrically connected to the serial communication line and to the plurality of select lines for controlling the remote operated relays;
    electrical power lugs for connecting the electrical power source;
    wherein the I/O controller board is near an edge of the panel board opposite the lugs.

8. The system of claim 6, further comprising a plurality of circuit breaker modules, each circuit breaker module being in a load circuit position in the panelboard and electrically connected to the electrical power source in series with a remote operated device in the position.

9. The system of claim 8, wherein the remote operated device is removable from the panel separately from the circuit breaker module.

10. The system of claim 1, wherein the remote operated device is a relay.

11. The system of claim 1, wherein the remote operated device is a dimming device.

12. The system of claim 1, wherein the remote operated device is a metering device.

13. The system of claim 1, wherein the remote operated device is a circuit breaker.

14. A remote operated device for selectively controlling and distributing electrical power from an electrical power source to a load circuit, comprising:
    a first terminal for receiving power from the electrical power source;
    a second terminal for connecting to the load circuit;
    a circuit device for controlling a conductive path between the first and second terminals;
    a serial communications interface coupled to the circuit device, for receiving a circuit device operation command on a serial communications line,;
    a select line terminal for connecting a select line thereto in parallel to the serial communications line, the select line capable of receiving an assertion signal; and
    a processor connected to the serial communications line through the serial communications interface, and in parallel to the select line through the select line terminal, and the circuit device, the processor being configured to operate the circuit device in response to a command only if the select line connected to the select line terminal is asserted.

15. The remote operated device of claim 14, further comprising:
    at least one sensor for determining a state of the circuit device, the sensor being connected to the processor; and
    wherein the processor is further configured to process a signal from the at least one sensor in response to a command only if the select line connected to the select line terminal is asserted.

16. The remote operated device of claim 14, further comprising a mechanical override switch for manually switching the conductive path between the first and second terminals.

17. The remote operated device of claim 14, further comprising a magnetic latch for operating the circuit device.

18. The remote operated device of claim 14, wherein the circuit device is a dimming device connected for adjusting power to the load circuit, the dimming device being connected for communication with the processor.

19. The remote operated device of claim 14, wherein the circuit device is a relay.

20. The remote operated device of claim 14, wherein the circuit device is a metering device.

21. The remote operated device of claim 14, wherein the circuit device is a circuit breaker.

22. A method for selectively controlling power to a load circuit that is coupled to a remote operated device having a relay, comprising the steps of:
   receiving over a serial communications line coupled to the remote operated device a command to close the relay between a power source and the load circuit;
   receiving a select signal over a select line coupled to the remote operated device, the select line being parallel to and separate from the serial communications line; and
   only if the select signal is in a select state, executing the command to close the relay.

23. The method of claim 22, further comprising the steps of:
   receiving over the serial communications line a command to open the relay;
   only if the select signal is in a select state, executing the command to open the relay.

24. The method of claim 22, further comprising the steps of:
   receiving over the serial communications line a command to perform diagnostics on the relay;
   only if the select signal is in a select state, executing the command to perform diagnostics on the relay.

25. The method of claim 22, wherein the step of executing the command to close the relay further comprises:
   applying a 1.7 amp, 24 volt, 2 to 2.5 ms pulse to the relay.

26. The method of claim 22, wherein the step of executing the command to close the relay further comprises:
   verifying that the relay is closed via a sensor for reading contact position.

27. The method of claim 22, further comprising the step of
   only if the select signal is not in a select state, ignoring the command to close the relay.

28. The method of claim 22, wherein the step of executing the command to close the relay is executed only if the select signal is in a select state at the time the command is received on the serial communications line.

29. A system for selectively distributing and controlling electrical power from an electrical power source to a plurality of load circuits, comprising:
   a plurality of circuit breakers, each being electrically connected to the electrical power source;
   a plurality of remote operated devices, each respective device being interposed and electrically connected in series between one of the respective circuit breakers and one load circuit;
   an I/O controller board for controlling the remote operated devices;
   a serial communications line interconnecting the plurality of remote operated devices and the I/O controller board; and
   a plurality of select lines in communication with the I/O controller board, each of the select lines being communicatively coupled to a corresponding remote operated device in parallel with the serial communications line;
   wherein each remote operated device is configured to execute commands received on the serial communications line only upon assertion by the I/O controller board of the select line connected to the corresponding remote operated device.

* * * * *